United States Patent
Phan et al.

(10) Patent No.: US 11,540,270 B2
(45) Date of Patent: Dec. 27, 2022

(54) METHODS AND APPARATUSES FOR COEXISTENCE OF TWO MODES OF VEHICLE-TO-VEHICLE COMMUNICATIONS

(71) Applicant: Nokia Technologies Oy, Espoo (FI)

(72) Inventors: Vinh Van Phan, Oulu (FI); Haitao Li, Beijing (CN); Ling Yu, Kauniainen (FI); Jedrzej Stanczak, Poznan (PL)

(73) Assignee: Nokia Technologies Oy, Espoo (FI)

( * ) Notice: Subject to any disclaimer, the term of this patent is extended or adjusted under 35 U.S.C. 154(b) by 76 days.

(21) Appl. No.: 16/632,571

(22) PCT Filed: Aug. 18, 2017

(86) PCT No.: PCT/CN2017/098116
§ 371 (c)(1),
(2) Date: Jan. 21, 2020

(87) PCT Pub. No.: WO2019/033413
PCT Pub. Date: Feb. 21, 2019

(65) Prior Publication Data
US 2020/0163067 A1 May 21, 2020

(51) Int. Cl.
*H04W 72/04* (2009.01)
*H04W 74/08* (2009.01)
*H04W 4/46* (2018.01)

(52) U.S. Cl.
CPC ........... *H04W 72/044* (2013.01); *H04W 4/46* (2018.02); *H04W 74/0808* (2013.01)

(58) Field of Classification Search
CPC .............. H04W 72/044; H04W 4/46; H04W 74/0808
See application file for complete search history.

(56) References Cited

U.S. PATENT DOCUMENTS

| | | | | |
|---|---|---|---|---|
| 10,856,176 | B2* | 12/2020 | Lee | H04W 74/002 |
| 10,993,245 | B2* | 4/2021 | Uchiyama | H04W 4/40 |
| 2015/0305046 | A1* | 10/2015 | Shin | H04W 52/241 |
| | | | | 370/329 |

(Continued)

FOREIGN PATENT DOCUMENTS

| | | |
|---|---|---|
| CN | 103069875 A | 4/2013 |
| CN | 106063310 A | 10/2016 |

(Continued)

OTHER PUBLICATIONS

Intel Corporation; "Sharing resource pool for eNB-controlled and UE-autonomous V2V transmission modes"; R1-1707303; 3GPP TSG RAN WG1 Meeting #89; Hangzhou, P.R. China; May 15-19, 2017; whole document (5 pages).

(Continued)

*Primary Examiner* — Rasheed Gidado
(74) *Attorney, Agent, or Firm* — Harrington & Smith

(57) ABSTRACT

Systems, methods, apparatuses, and computer program products relating to the coexistence of a first mode and second mode of vehicle-to-vehicle (V2V) communications. One method includes allocating, to a user equipment (UE) operating in a first mode of V2V communication that is also configured to use resources from a shared transmit (Tx) pool of a second mode of V2V communication, a pair of resources. The first of the pair of resources may be allocated from an exclusive Tx pool for the first mode, and the second of the pair of resources may be allocated from the shared Tx pool of the second mode of V2V communication.

20 Claims, 3 Drawing Sheets

(56) References Cited

U.S. PATENT DOCUMENTS

| | | | | |
|---|---|---|---|---|
| 2016/0021676 A1* | 1/2016 | Yamazaki | ............. | H04W 72/10 |
| | | | | 370/329 |
| 2017/0006594 A1* | 1/2017 | Wei | ................... | H04W 72/1242 |
| 2017/0230939 A1* | 8/2017 | Rudolf | ................... | H04W 72/04 |
| 2017/0332352 A1* | 11/2017 | Sheng | ...................... | H04L 67/12 |
| 2018/0376308 A1* | 12/2018 | Xiao | ....................... | H04L 69/14 |
| 2019/0215806 A1* | 7/2019 | Chai | ....................... | H04W 92/20 |
| 2019/0380132 A1* | 12/2019 | Hu | .......................... | H04W 4/46 |
| 2020/0120511 A1* | 4/2020 | Liu | ....................... | H04L 5/0048 |
| 2020/0267709 A1* | 8/2020 | Feng | ..................... | H04L 1/1812 |

FOREIGN PATENT DOCUMENTS

| | | |
|---|---|---|
| CN | 106304360 A | 1/2017 |
| CN | 107040865 A | 8/2017 |
| JP | 4294406 B2 | 7/2009 |
| WO | WO 2015/039342 A1 | 3/2015 |
| WO | WO-2015/143170 A1 | 9/2015 |
| WO | WO 2016/073111 A2 | 5/2016 |
| WO | WO 2017/116108 A1 | 7/2017 |

OTHER PUBLICATIONS

ZTE; "Scheduling of V2X SPS resources"; R1-1609804; 3GPP TSG RAN WG1 Meeting #86bis; Lisbon, Portugal; Oct. 10-14, 2016; whole document (4 pages).

CATT; "Discussion on resource pool sharing between mode 3 and mode 4"; R1-1707450; 3GPP TSG RAN WG1 Meeting #89; Hangzhou, P.R. China; May 15-19, 2017; whole document (3 pages).

\* cited by examiner

METHODS AND APPARATUSES FOR COEXISTENCE OF TWO MODES OF VEHICLE-TO-VEHICLE COMMUNICATIONS

CROSS REFERENCE TO RELATED APPLICATION

This patent application is a U.S. National Stage application of International Patent Application Number PCT/CN2017/098116 filed Aug. 18, 2017, which is hereby incorporated by reference in its entirety.

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-Advanced Pro, $5^{th}$ generation (5G) radio access technology, and/or new radio access technology (NR). For example, some embodiments may relate to vehicular communications, such as communications between a vehicle and another vehicle, between a vehicle and the network, and/or between a vehicle and other user equipment or devices.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (Evolved-UTRAN), the air interface design, protocol architecture and multiple-access principles are new compared to that of UTRAN, and no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN improved efficiency and services, offers lower costs, and provides new spectrum opportunities, compared to the earlier generations. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD). Carrier aggregation or said dual connectivity further allows operating on multiple component carriers at the same time hence multiplying the performance such as data rates per user.

As mentioned above, LTE may also improve spectral efficiency in networks, allowing carriers to provide more data and voice services over a given bandwidth. Therefore, LTE is designed to fulfill the needs for high-speed data and media transport in addition to high capacity voice support. Advantages of LTE include, for example, high throughput, low latency, FDD and TDD support in the same platform, an improved end-user experience, and a simple architecture resulting in low operating costs.

Certain further releases of 3GPP LTE (e.g., LTE Rel-10, LTE Rel-11) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers. The next releases of 3GPP LTE (e.g. LTE Rel-12, LTE Rel-13, LTE Rel-14, LTE Rel-15) are targeted for further improvements of specialized services, shorter latency and meeting requirements approaching the 5G. The support for Proximity Services (ProSe) device-to-device (D2D), vehicle-to-anything (V2X), and vehicle-to-vehicle (V2V) communications are specified in these releases.

$5^{th}$ generation (5G) or new radio (NR) wireless systems refer to the next generation (NG) of radio systems and network architecture. 5G is also known to appear as the IMT-2020 system. It is estimated that 5G will provide bitrates on the order of 10-20 Gbit/s or higher. 5G will support at least enhanced mobile broadband (eMBB) and ultra-reliable low-latency-communication (URLLC). 5G is also expected to increase network expandability up to hundreds of thousands of connections. The signal technology of 5G is anticipated for greater coverage as well as spectral and signaling efficiency. 5G is expected to deliver extreme broadband and ultra-robust, low latency connectivity and massive networking to support the Internet of Things (IoT). With IoT, machine-to-machine (M2M), vehicle-to-anything (V2X), and vehicle-to-vehicle (V2V) communication becoming more widespread, there will be a growing need for networks that meet the needs of lower power, low data rate, and long battery life. In 5G or NR, the Node B or eNB may be referred to as a next generation Node B (gNB).

SUMMARY

One embodiment is directed to a method that may include allocating a pair of resources to a user equipment operating in a first mode of V2V communication and that is also configured to use resources from a shared transmit (Tx) pool of a second mode of V2V communication. A first resource of the pair of resources is allocated from an exclusive Tx pool for the first mode, and a second resource of the pair of resources is allocated from the shared Tx pool of the second mode (and first mode). The method may also include receiving an indication from the user equipment to release the first resource after the user equipment determines that the second resource is ready to replace the first resource, and releasing the first resource in response to receiving the indication from the user equipment.

Another embodiment is directed to an apparatus that may include allocating means for allocating a pair of resources to a user equipment operating in a first mode of vehicle-to-vehicle (V2V) communication and that is also configured to use resources from a shared transmit (Tx) pool of a second mode of V2V communication. A first resource of the pair of resources is allocated from an exclusive Tx pool for the first mode, and a second resource of the pair of resources is allocated from the shared Tx pool of the second mode (and the first mode). The apparatus further includes receiving means for receiving an indication from the user equipment to release the first resource after the user equipment determines that the second resource is ready to replace the first resource, and releasing means for releasing the first resource in response to receiving the indication from the user equipment.

Another embodiment is directed to an apparatus that may include at least one processor and at least one memory including computer program code. The at least one memory and the computer program code are configured, with the at least one processor, to cause the apparatus at least to allocate a pair of resources to a user equipment operating in a first mode of vehicle-to-vehicle (V2V) communication and that is configured to use resources from a shared transmit (Tx) pool of a second mode of V2V communication. A first resource of the pair of resources is allocated from an exclusive Tx pool for the first mode, and a second resource of the pair of resources is allocated from the shared Tx pool. The at least one memory and the computer program code are configured, with the at least one processor, to cause the apparatus at least to receive an indication from the user equipment to release the first resource after the user equipment determines that the second resource is ready to replace the first resource, and to release the first resource in response to receiving the indication from the user equipment.

Another embodiment is directed to a method that may include receiving, from a network node, an allocation of a pair of resources at a user equipment operating in a first mode of V2V communication that is also configured to use resources from a shared transmit (Tx) pool of a second mode of V2V communication. A first resource of the pair of resources is allocated from an exclusive Tx pool for the first mode, and a second resource of the pair of resources is allocated from the shared Tx pool. The method may also include determining whether the second resource is ready to replace the first resource, and replacing the first resource with the second resource when it is determined that the second resource is ready to replace the first resource.

Another embodiment is directed to an apparatus that may include receiving means for receiving, from a network node, an allocation of a pair of resources. The apparatus may include a user equipment operating in a first mode of vehicle-to-vehicle (V2V) communication that is also configured to use resources from a shared transmit (Tx) pool of a second mode of V2V communication. A first resource of the pair of resources is allocated from an exclusive Tx pool for the first mode, and a second resource of the pair of resources is allocated from the shared Tx pool. The apparatus may also include determining means for determining whether the second resource is ready to replace the first resource, and replacing means for replacing the first resource with the second resource when it is determined that the second resource is ready to replace the first resource.

Another embodiment is directed to an apparatus that may include at least one processor and at least one memory including computer program code. The at least one memory and the computer program code are configured, with the at least one processor, to cause the apparatus at least to receive, from a network node, an allocation of a pair of resources. The apparatus may include a user equipment operating in a first mode of vehicle-to-vehicle (V2V) communication that is also configured to use resources from a shared transmit (Tx) pool of a second mode of V2V communication. A first resource of the pair of resources is allocated from an exclusive Tx pool for the first mode, and a second resource of the pair of resources is allocated from the shared Tx pool. The at least one memory and the computer program code are configured, with the at least one processor, to cause the apparatus at least to determine whether the second resource is ready to replace the first resource, and to replace the first resource with the second resource when it is determined that the second resource is ready to replace the first resource.

BRIEF DESCRIPTION OF THE DRAWINGS

For proper understanding of the invention, reference should be made to the accompanying drawings, wherein.

DETAILED DESCRIPTION

Figure 1:
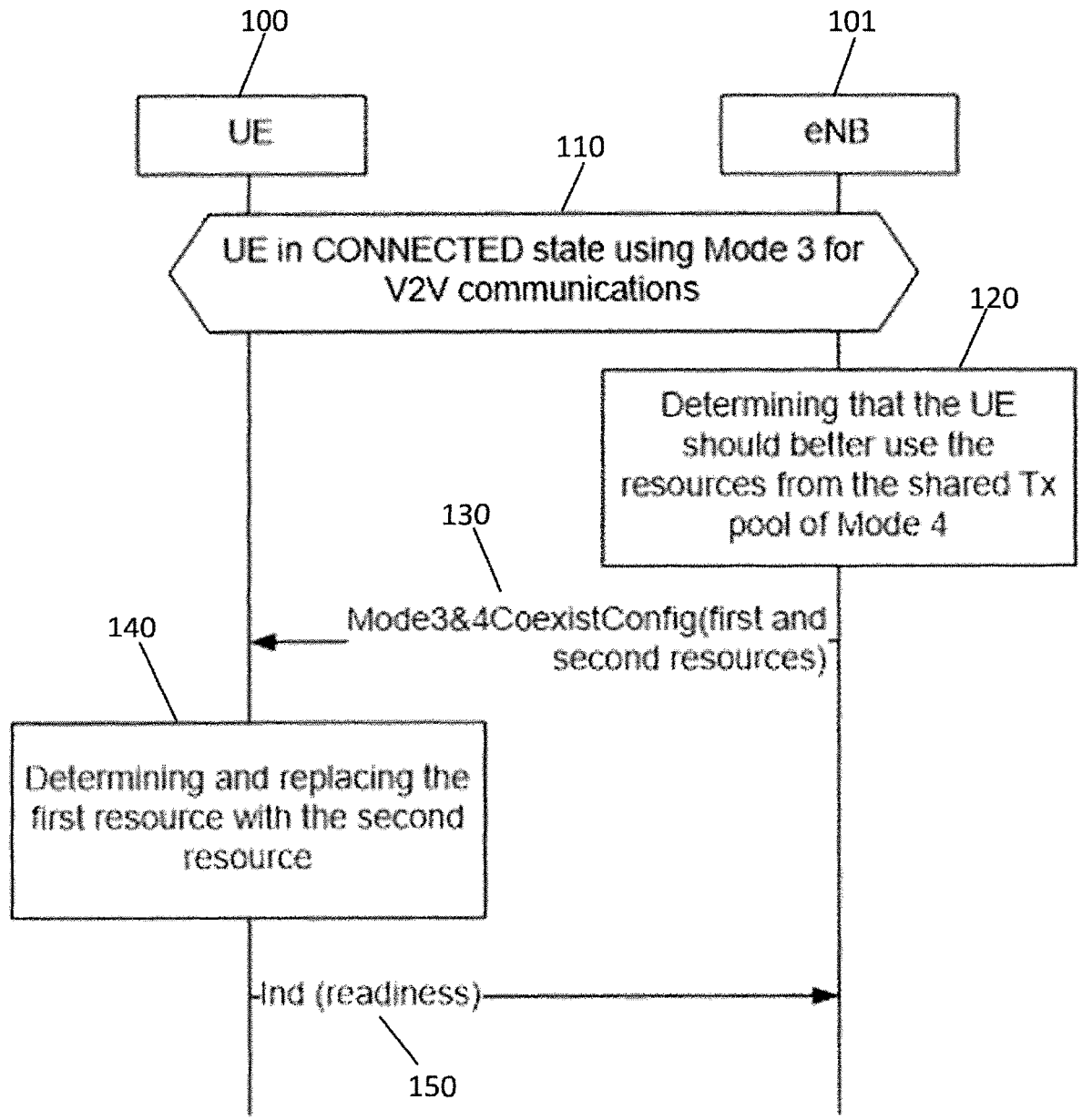
FIG. 1 illustrates an example signaling diagram depicting the signaling between a UE and eNB, according to one embodiment.

It will be readily understood that the components of the invention, as generally described and illustrated in the figures herein, may be arranged and designed in a wide variety of different configurations. Thus, the following detailed description of the embodiments of systems, methods, apparatuses, and computer program products relating to the coexistence of two modes (e.g., Mode 3 and Mode 4) of vehicle-to-vehicle (V2V) communications, as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Certain embodiments may relate to 3GPP LTE Rel-15 (and beyond) standardization of V2X communications, which is also referred to as phase 2 of LTE support for V2X. 3GPP work item RP-170798, which is incorporated by reference in its entirety herein, is a 3GPP work item intended to specify 3GPP V2X phase 2 to support advanced V2X services.

One of the technical items in the agenda for V2X phase 2 is backward- and forward-compatible coexistence of Mode 3 and Mode 4 of V2V communications. Mode 3 refers to the transmit (Tx) mode using network scheduled resource allocation, whereas Mode 4 refers to using UE sensing-based autonomous resource selection, as specified in 3GPP LTE Rel-14.

Allowing Mode 3 and Mode 4 to share the same Tx resource pool for more efficient resource utilization is one of the LTE-based V2X phase 2 objectives. A motivation behind this is that, for example, whenever the load or channel busy rate (CBR) over the Tx pool of Mode 4 is low enough, utilizing resources of the Tx pool of Mode 4 for transmissions of Mode 3 is beneficial. A main technical problem related to this is how to avoid and resolve possible collision in selecting or allocating the same resource(s) from the shared Tx pool for transmissions of a UE in Mode 3 and other UE(s) in Mode 4. Certain embodiments therefore provide efficient methods to solve at least the problem discussed above, while providing efficient coexistence of Mode 3 and Mode 4 over the shared Tx pool.

Some solutions that are being discussed include Mode 3 UE sensing, Mode 3 scheduling assignment (SA) includes resource reservation information, Mode indicator in SA, collision detection of Mode 4, and/or Mode 3 UE reports sensing result to eNB. It is noted that having the Mode 3 UE performing sensing and reporting the sensing results to the serving eNB, so that the serving eNB may make scheduling decision and allocate resources from the shared Tx pool for the UE in Mode 3, may introduce significant overhead, as compared to Rel-14 standardized Mode 3. Moreover, such centralized decision-making from the serving eNB neither ensures a collision free allocation for Mode 3 nor reduces collision probability between Mode 3 and Mode 4 UEs while sharing the same Tx pool. This is because collision may happen if other Mode 4 UEs during the feedback control of the resource allocation between the serving eNB and the UE in Mode 3 select and use the same resource allocation.

One embodiment provides that, for the UE in Mode 3 which is configured to use the resources from the shared Tx pool for transmissions of Mode 3 the serving eNB initially allocates the Mode 3 UE with a pair of resources. The first of the pair of resources is from an exclusive Tx pool of Mode 3, and the second of the pair of resources is from the shared Tx pool. The first one may be used until the UE determines that the second one is collision-free and ready to replace the first one for transmission of the UE, as in Mode 3. Then, the UE may send an indication to the serving eNB to release the first one.

Certain embodiments provide that the second resource may be configured to the UE explicitly or implicitly, which may respectively cause different UE behaviours. If the second resource is configured explicitly, the UE monitors the configured second resource and assures the second resource is ready while using the first resource for the transmission primarily. Then, once the second resource is ready to replace the first one, an indication is sent to the serving eNB indicating just the readiness that may be realized, for example, by a 1-bit indication. If the second resource is configured implicitly, the UE may need to perform sensing based resource selection as in Mode 4 over the shared Tx pool while using the first resource for the transmission primarily. In this case, the UE may use the first resource until it determines that the selected second resource is ready to replace the first one. Then, the indication from the UE to the serving eNB informs the eNB about the readiness and also the selected second resource. To ensure a full network control of the allocated resources for UEs in Mode 3, the eNB may then send an explicit confirmation whether to grant the UE to use the indicated second resource as such or any specific portion thereof with possible further configurations from the eNB. This step may be made optional. It is also noted that the explicit confirmation may also be issued for releasing of the first resource.

In an embodiment, for enhancing the robustness of the operation, the serving eNB may configure UEs in Mode 3 to monitor and report on those secondary resources, at least those second resources being used in replacement of the paired first resources by UEs in Mode 3. Based on that, the serving eNB may initiate necessary reconfiguration and reallocation of resources for a targeted UE in Mode 3.

FIG. 1 illustrates an example signaling diagram, according to an embodiment. As illustrated in FIG. 1 at 110, in one embodiment, the UE 100 may be in a connected state being served by the eNB 101 using Mode 3 for V2V communication. At 120, the eNB 101 may determine that the UE 100 may benefit from using the resources from the shared Tx pool of Mode 4. The eNB 101 may then transmit or signal to the UE 100, at 130, a Mode 3 & Mode 4 coexistence configuration including an allocation of first and secondary resources, as described above.

In an embodiment, the UE 100 can rely on the first or primary resource not only to transmit and maintain quality of service (QoS) at this stage but also to check and reassure the usage of the second or secondary resource will not lead to a collision. The first resource may be a semi-persistent scheduling (SPS) resource. In some embodiments, the configuration of the first resource and the secondary resource does not necessarily happen at the same time. However, the first/primary resource should not be given to the UE after the secondary resource.

Continuing with the example of FIG. 1, at 140, the UE 100 may determine that the first resource is ready to be replaced, and then replace the first resource with the secondary resource. One option for implementing the determining-and-replacing step 140 includes that the UE 100 may send the SA indicating that the secondary resource will be used with possible repetitions as well as reserved for further transmissions, as specified in 3GPP Rel-14 and expected to be enhanced in 3GPP Rel-15. However, instead of transmitting on the secondary resource as indicated in the SA, the UE monitors if any other UEs transmit on the reserved secondary resource. This may be repeated a few times on selected scheduled transmission occasions of the secondary resource so that the UE can be reassured in determining and replacing the first/primary resource with the secondary resource. For further collision reduction, the number of attempts may also be randomly chosen before actually replacing the first/primary resource with the secondary resource. It is noted that the selected scheduled transmission occasions of the secondary resource are supposed not to be in conflict with that of the first/primary resource. After completing the determining-and-replacing step 140, the UE 100 may send an indication to the eNB 101 to release the first/primary resource.

Figure 2A:
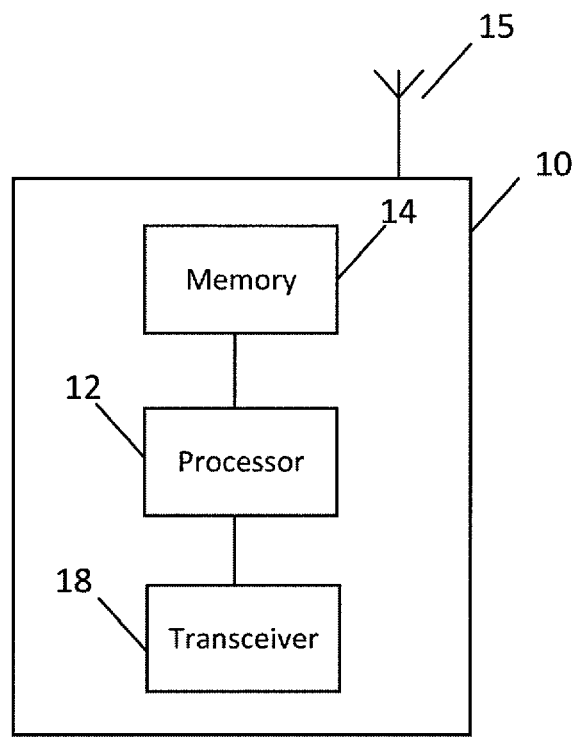
FIG. 2a illustrates an example block diagram of an apparatus, according to an embodiment.

FIG. 2a illustrates an example of an apparatus 10 according to an embodiment. In an embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), WLAN access point, mobility management entity (MME), or subscription server associated with a radio access network, such as a GSM network, LTE network, 5G or NR.

It should be understood that apparatus 10 may be comprised of an edge cloud server as a distributed computing system where the server and the radio node may be standalone apparatuses communicating with each other via a radio path or via a wired connection, or they may be located in a same entity communicating via a wired connection. It should be noted that one of ordinary skill in the art would understand that apparatus 10 may include components or features not shown in FIG. 2a.

As illustrated in FIG. 2a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

While a single processor 12 is shown in FIG. 2a, multiple processors may be utilized according to other embodiments. For example, it should be understood that, in certain embodiments, apparatus 10 may include two or more processors that may form a multiprocessor system (i.e., in this case processor 12 represents a multiprocessor) that may support multiprocessing. In certain embodiments, the multiprocessor system may be tightly coupled or loosely coupled (e.g., to form a computer cluster).

Processor 12 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In certain embodiments, apparatus 10 may be a network node or RAN node, such as a base station, access point, Node B, eNB, 5G or new radio Node B (gNB) or access point, WLAN access point, or the like. According to certain embodiments, apparatus 10 may be controlled by memory 14 and processor 12 to perform the functions associated with any of the embodiments described herein.

In one embodiment, apparatus 10 may be controlled by memory 14 and processor 12 to initially allocate, to a UE operating in a first mode of V2V communication and that is configured to use resources from a shared Tx pool of a second mode of V2V communication, a pair of resources (i.e., a first resource and second resource). The first of the pair of resources (which may also be referred to as the primary resource) may be allocated from an exclusive Tx pool for the first mode, and the second of the pair of resources (which may also be referred to as the secondary resource) may be allocated from the shared Tx pool of the second mode (and first mode). In one embodiment, the first mode of V2V communication may be the Mode 3 of V2V communication as specified in 3GPP Rel-14 and beyond, and the second mode of V2V communication may be the Mode 4 of V2V communication as also specified in 3GPP Rel-14 and beyond.

In certain embodiments, the second resource may be allocated or configured to the UE explicitly or implicitly. When the second resource is allocated explicitly, the UE monitors the configured second resource to ensure that the second resource is ready while using the first resource for the transmission. When the second resource is allocated implicitly, the UE may perform sensing based resource selection as in Mode 4 over the shared Tx pool while using the first resource for the transmission.

According to an embodiment, the UE may use the first of the pair of resources until the UE determines that the second resource is collision-free and ready to replace the first resource for transmission of the UE. According to an embodiment, when the UE determines that the second resource is ready to replace the first resource, apparatus 10 may be controlled by memory 14 and processor 12 to receive an indication from the UE to release the first resource. When the second resource was allocated explicitly, once the UE determines that the second resource is ready to replace the first resource, apparatus 10 may be controlled by memory 14 and processor 12 to receive the indication from the UE indicating the readiness of the user equipment to replace the first resource with the secondary resource, for example, as a 1-bit indication. When the secondary resource was allocated implicitly, apparatus 10 may be controlled by memory 14 and processor 12 to receive the indication from the UE informing about the readiness of the UE to replace the first resource with the second resource and optionally informing about the second resource selected by the UE. Apparatus 10 may then be controlled by memory 14 and processor 12 to release the first resource in response to receiving the indication from the UE.

In some embodiments, apparatus 10 may be controlled by memory 14 and processor 12 to configure UEs in the first mode (e.g., Mode 3) to monitor and report on the second resources, and to initiate any necessary reconfiguration and/or re-allocation of resources for a targeted UE in the first mode (e.g., Mode 3).

Figure 2B:
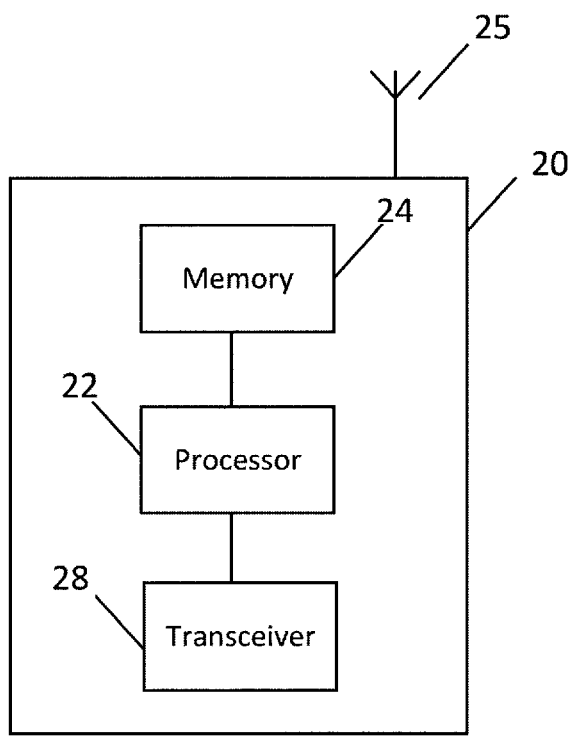
FIG. 2b illustrates an example block diagram of an apparatus, according to another embodiment.

FIG. 2*b* illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, and the like), one or more radio access components (for example, a modem, a transceiver, and the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and any other radio access technologies. It should be noted that one of ordinary skill in the art would understand that apparatus 20 may include components or features not shown in FIG. 2*b*.

As illustrated in FIG. 2*b*, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 2*b*, multiple processors may be utilized according to other embodiments. For example, it should be understood that, in certain embodiments, apparatus 20 may include two or more processors that may form a multiprocessor system (i.e., in this case processor 22 represents a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 24 can be comprised of any combination of random access memory (RAM), read only memory (ROM), static storage such as a magnetic or optical disk, or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to one embodiment, apparatus 20 may be a UE, mobile device, mobile station, ME, IoT device and/or NB-IoT device, capable of V2X communication, for example. More specifically, according to an embodiment, apparatus 20 may be able to support V2X, i.e., at least communicate with an eNB over regular cellular access radio interface and other UEs over D2D or V2V radio interface. In an embodiment, apparatus 20 may be a UE operating in a first mode of V2V communication that is also configured to use the resources from a shared Tx pool of a second mode of V2V communication. In one embodiment, the first mode of V2V communication may be the Mode 3 of V2V communication as specified in 3GPP Rel-14 and beyond, and the second mode of V2V communication may be the Mode 4 of V2V communication as also specified in 3GPP Rel-14 and beyond.

According to certain embodiments, apparatus 20 may be controlled by memory 24 and processor 22 to perform the functions associated with embodiments described herein. For example, in some embodiments, apparatus 20 may be configured to perform one or more of the processes depicted in any of the flow charts or signaling diagrams described herein.

According to one embodiment, apparatus 20 may be controlled by memory 24 and processor 22 to receive, from a serving eNB, an allocation of a pair of resources. The first of the pair of resources may be allocated from an exclusive Tx pool for the first mode (e.g., Mode 3), and the second of the pair of resources may be allocated from the shared Tx pool of the second mode (e.g., Mode 4) and the first mode (e.g., Mode 3).

For example, in an embodiment, apparatus 20 may be controlled by memory 24 and processor 22 to use the first resource until the UE determines that the second resource is collision-free and ready to replace the first resource for transmission of the UE, as in the first mode (e.g., Mode 3).

In some embodiments, apparatus 20 may rely on the first/primary resource not only to transmit and maintain QoS at this stage, but also to determine and reassure the usage of the second/secondary resource will not lead to a collision. The first resource may be a SPS resource. Receipt of the configuration of the first resource and the second resource does not necessarily happen at the same time. However, the second resource should not be received at apparatus 20 before the first resource. In an embodiment, apparatus 20 may be controlled by memory 24 and processor 22 to send the SA indicating that the second resource will be used with possible repetitions as well as reserved for further transmissions. In an embodiment, apparatus 20 may be controlled by memory 24 and processor 22 to, instead of transmitting on the second resource, monitor if any other UEs transmit on the reserved second resource. According to some embodiments, this may be repeated a few times on selected scheduled transmission occasions of the second resource so that apparatus 20 can be reassured in determining and replacing the first resource with the second resource. For further collision reduction, the attempt times may be randomly chosen before actually replacing the first resource with the second resource. Then, apparatus 20 may be controlled by memory 24 and processor 22 to send an indication to the serving eNB to release the first resource.

In certain embodiments, the second resource may be allocated to apparatus 20 explicitly or implicitly. When the second resource is configured explicitly, apparatus 20 may be controlled by memory 24 and processor 22 to monitor the configured second resource and assure that the second resource is ready while using the first resource for the transmission primarily. Once the second resource is ready to replace the first one, apparatus 20 may be controlled by memory 24 and processor 22 to send the indication to the serving eNB indicating the readiness of apparatus 20 to replace the first resource with the second resource, which may be realized, for example, by a 1-bit indication. When the second resource is configured implicitly, apparatus 20 may be controlled by memory 24 and processor 22 to perform sensing-based resource selection as in the second (e.g., Mode 4) over the shared Tx pool while using the first resource for the transmission primarily. In this case, apparatus 20 may be controlled by memory 24 and processor 22 to use the first resource until it determines that the selected second resource is ready to replace the first resource. Then, the indication from the apparatus 20 to the serving eNB informs about the readiness and optionally may inform about the selected second resource.

Figure 3A:
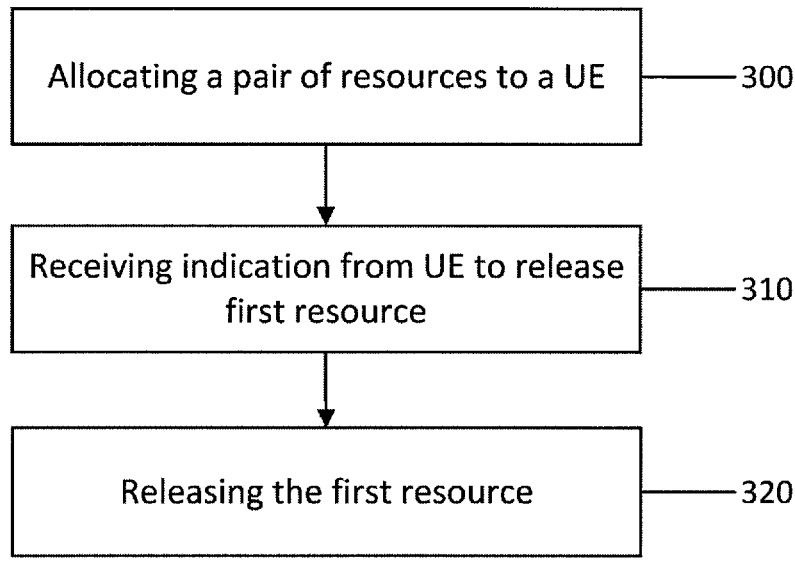
FIG. 3a illustrates an example flow diagram of a method, according to an embodiment.

FIG. 3a illustrates an example flow diagram of a method, according to one embodiment. The method may be performed by a network node, such as a base station, eNB, gNB, or access node, for example. The method of FIG. 3a may include, at 300, initially allocating, to a UE in a first mode of V2V communication that is configured to use resources from a shared Tx pool of a second mode of V2V communication, a pair of resources (i.e., a first resource and a second resource). In one embodiment, the first mode of V2V communication may be the Mode 3 of V2V communication as specified in 3GPP Rel-14 and beyond, and the second mode of V2V communication may be the Mode 4 of V2V communication as also specified in 3GPP Rel-14 and beyond. The first of the pair of resources (which may also be referred to as the primary resource) may be allocated from an exclusive Tx pool for Mode 3, and the second of the pair of resources (which may also be referred to as the secondary resource) may be allocated from the shared Tx pool of Mode 4 (and Mode 3). In certain embodiments, the allocating 300 may include allocating or configuring the second resource to the UE explicitly or implicitly. When the second resource is allocated explicitly, the UE monitors the configured second resource to ensure that the second resource is ready while using the first resource for the transmission. When the second resource is allocated implicitly, the UE may perform sensing based resource selection as in Mode 4 for selecting the second resource over the shared Tx pool while using the first resource for the transmission.

According to an embodiment, the UE may use the first of the pair of resources until the UE determines that the second resource is collision-free and ready to replace the first resource for transmission of the UE, as in Mode 3. According to an embodiment, when the UE determines that the second resource is ready to replace the first resource, the method may include, at 310, receiving an indication from the UE to release the first resource. When the second resource was allocated explicitly, once the UE determines that the second resource is ready to replace the first resource, the receiving of the indication 310 may include receiving the indication from the UE indicating the readiness of the UE to replace the first resource with the second resource, for example, as a 1-bit indication. When the second resource was allocated implicitly, the receiving of the indication 310 may include receiving the indication from the UE informing about the readiness of the UE to replace the first resource and optionally informing about the selected second resource.

In an embodiment, the method may also include, at 320, releasing the first resource in response to receiving the indication from the UE.

In some embodiments, the method may further include configuring UEs in the first mode (e.g., Mode 3) to monitor and report on the second resources, and, based on the reports, initiating any necessary reconfiguration and/or re-allocation of resources for a targeted UE in the first mode (e.g., Mode 3).

Figure 3B:
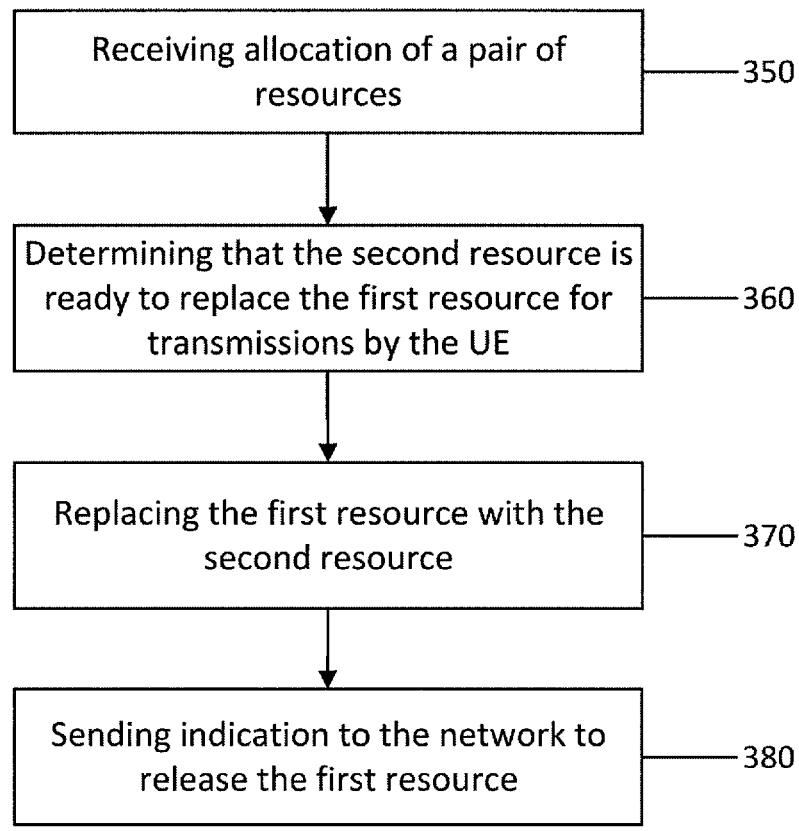
FIG. 3b illustrates an example flow diagram of a method, according to another embodiment.

FIG. 3b illustrates an example flow diagram of a method, according to one embodiment. The method may be performed by a UE or mobile station, for example, operating in a first mode of V2V communication (e.g., Mode 3) that is also configured to use the resources from a shared Tx pool of a second mode of V2V communication (e.g., Mode 4). In an embodiment, the method of FIG. 3b may include, at 350, receiving, from a serving eNB, an allocation of a pair of resources. The first of the pair of resources may be allocated from an exclusive Tx pool for the first mode (e.g., Mode 3) of V2V communication, and the second of the pair of resources may be allocated from the shared Tx pool of the second mode (e.g., Mode 4) of V2V communication. According to an embodiment, the first resource may be a SPS resource. The receiving 350 of the configuration of the first resource and the second resource does not necessarily happen at the same time. However, the second resource should not be received at the UE before the first resource.

In one embodiment, the method may further include the UE using the first resource and then determining, at 360, that the second resource is ready to replace the first resource for transmission of the UE. For example, in an embodiment, the determining 360 that the secondary resource is ready to replace the first resource may include determining that the second resource is collision-free. In some embodiments, the UE may rely on the first resource to initially transmit and maintain QoS at this stage, and also for the determining and assuring that the usage of second resources will not lead to a collision.

According to certain embodiments, when it is determined that the second resource is ready to replace the first resource, the method may include, at 370, replacing the first resource with the second resource and, at 380, sending an indication to the serving eNB to release the first resource. In an embodiment, the determining 360 may further include sending a SA by the UE (to other UEs in proximity of the UE) over the V2V radio interface indicating that the secondary resource will be used with possible repetitions as well as reserved for further transmissions. In an embodiment, the method may include, instead of transmitting on the second resource as indicated in the SA, monitoring by the UE if any other UEs transmit on the reserved second resource. According to some embodiments, this may be repeated a few times on selected scheduled transmission occasions of the second resource so that the UE can be reassured in determining and replacing the first resource with the second resource. For further collision reduction, the attempt times may be randomly chosen before actually replacing the first resource with the second resource.

In certain embodiments, the receiving 350 of the allocation of the resources may include receiving an explicit or implicit allocation of the second resource. When the second resource is configured explicitly, the method may include monitoring, at the determining 360, the configured second resource and determining that the second resource is ready to replace the first resource while using the first resource for the transmission primarily. Once the second resource is ready to replace the first one, the method may include sending the indication to the serving eNB at 380 indicating the readiness which may be realized, for example, by a 1-bit indication. When the second resource is configured implicitly, the method may further include performing sensing-based resource selection as in Mode 4 over the shared Tx pool to select the second resource while using the first resource for the transmission primarily. In this case, the method may include using the first resource until the UE determines that the selected second resource is ready to replace the first one, and then sending the indication to the serving eNB at 380 including information about the readiness to use the second resource and optionally indicating the selected second resource.

Therefore, embodiments allow for an efficient backward or forward compatible coexistence of two modes of V2V communication, such as Mode 3 and Mode 4. In particular, an embodiment enables efficient sharing of the Tx pool for Mode 3 and Mode 4 which can be implemented on top of 3GPP Rel-14 with low additional control overhead. The exclusive Tx pool for Mode 3 does not need to be maintained as a large pool, as the resources thereof can be reused after the UE switches to use resource from the shared Tx pool and returns the dedicated resource from the exclusive Tx pool back to the eNB. The exclusive Tx pool for Mode 3 may be of Rel-14 Mode 3 or, that is, shared between Rel-14 Mode 3 and Rel-15 (and beyond) Mode 3. As a result, certain embodiments can improve performance and throughput of devices and network nodes including, for example, base stations, eNBs, gNBs and/or UEs. Accordingly, the use of embodiments of the invention result in improved functioning of communications networks and their nodes.

In some embodiments, the functionality of any of the methods, processes, signaling diagrams, or flow charts described herein may be implemented by software and/or computer program code or portions of code stored in memory or other computer readable or tangible media, and executed by a processor.

In certain embodiments, an apparatus may be included or be associated with at least one software application, module, unit or entity configured as arithmetic operation(s), or as a program or portions of it (including an added or updated software routine), executed by at least one operation processor. Programs, also called computer program products or computer programs, including software routines, applets and macros, may be stored in any apparatus-readable data storage medium and include program instructions to perform particular tasks.

A computer program product may comprise one or more computer-executable components which, when the program is run, are configured to carry out embodiments described herein. The one or more computer-executable components may include at least one software code or portions of code. Modifications and configurations required for implementing the functionality of an embodiment may be performed as routine(s), which may be implemented as added or updated software routine(s). In some embodiments, software routine(s) may be downloaded into the apparatus.

Software or a computer program code or portions of code may be in a source code form, object code form, or in some intermediate form, and may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and/or software distribution package, for example. Depending on the processing power needed, the computer program may be executed in a single electronic digital device or it may be distributed amongst a number of devices or computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation(s) and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. An apparatus, comprising:
   at least one processor; and
   at least one non-transitory memory including computer program code,
   wherein the at least one memory and the computer program code are configured, with the at least one processor, to cause a network node at least to:
   allocate a pair of resources to a user equipment operating in a first mode of vehicle-to-vehicle communication that is configured to use resources from a shared transmit pool of a second mode of vehicle-to-vehicle communication, wherein a first resource of the pair of resources is allocated from an exclusive transmit pool for the first mode, and a second resource of the pair of resources is allocated from the shared transmit pool;
   receive an indication from the user equipment to release the first resource after the user equipment determines that the second resource is ready to replace the first resource; and
   release the first resource in response to receiving the indication from the user equipment.

2. The apparatus according to claim 1, wherein the first mode of vehicle-to-vehicle communication is based on network scheduled resource allocation and the second mode of vehicle-to-vehicle communication is based on user equipment selected autonomous resource allocation.

3. The apparatus according to claim 1, wherein the first mode and the second mode of vehicle-to-vehicle communication are respectively Mode 3 and Mode 4 of vehicle-to-vehicle communications as specified in 3rd generation partnership project (3GPP) Release-14 and beyond.

4. The apparatus according to claim 1, wherein the allocating comprises allocating the second resource to the user equipment explicitly or implicitly.

5. The apparatus according to claim 4, wherein, when the second resource is allocated implicitly, the receiving of the indication comprises receiving the indication informing about the second resource selected by the user equipment.

6. The apparatus according to claim 1, wherein the receiving of the indication comprises receiving the indication of a readiness of the user equipment to replace the first resource with the second resource.

7. The apparatus according to claim 6, wherein the indication of the readiness is realized with a 1 bit indication.

8. The apparatus according to claim 1, wherein the at least one memory and the computer program code are further configured to, with the at least one processor, cause the network node to:
   configure user equipment in the first mode to monitor and report on the second resources; and
   based on the reports, initiate reconfiguration and/or re-allocation of resources for a targeted user equipment in the first mode.

9. An apparatus, comprising:
   at least one processor; and
   at least one non-transitory memory including computer program code,
   wherein the at least one memory and the computer program code are configured, with the at least one processor, to cause the apparatus at least to:
   receive, from a network node, an allocation of a pair of resources at a user equipment operating in a first mode of vehicle-to-vehicle communication that is configured to use resources from a shared transmit pool of a second mode of vehicle-to-vehicle communication, wherein a first resource of the pair of resources is allocated from an exclusive transmit pool for the first mode, and a second resource of the pair of resources is allocated from the shared transmit pool;
   determine whether the second resource is ready to replace the first resource; and
   replace the first resource with the second resource when it is determined that the second resource is ready to replace the first resource.

10. The apparatus according to claim 9, wherein the first mode of vehicle-to-vehicle communication is based on network scheduled resource allocation and the second mode of vehicle-to-vehicle communication is based on user equipment selected autonomous resource allocation.

11. The apparatus according to claim 9, wherein the first mode and second mode of vehicle-to-vehicle communication are respectively Mode 3 and Mode 4 of vehicle-to-vehicle communications as specified in 3rd generation partnership project (3GPP) Release-14 and beyond.

12. The apparatus according to claim 9, wherein the determining that the second resource is ready to replace the first resource comprises determining that the second resource is collision-free.

13. The apparatus according to claim 9, wherein the at least one memory and the computer program code are further configured to, with the at least one processor, cause the apparatus to, when it is determined that the second resource is ready to replace the first resource, send an indication to the network node to release the first resource.

14. The apparatus according to claim 13, wherein:

the determining further comprises:

monitor the allocated second resource and determining that the second resource is ready while using the first resource for transmission; and when the second resource is ready to replace the first resource, the sending of the indication comprises:

send an indication to the network node indicating the readiness of the user equipment to replace the first resource with the second resource.

15. The apparatus according to claim 9, wherein the receiving of the allocation of the pair of resources further comprises:

receive an explicit or implicit allocation of the second resource.

16. The apparatus according to claim 15, wherein, when the second resource is allocated implicitly, the at least one memory and the computer program code are further configured to, with the at least one processor, cause the apparatus to:

perform resource selection over the shared transmit pool while using the first resource for the transmission until it is determined that the allocated second resource is ready to replace the first resource; and send information indicating the second resource selected by the user equipment.

17. The apparatus according to claim 9, wherein the determining comprises monitoring one or more times whether any other user equipment transmit on the allocated second resource.

18. A method, comprising:

receiving, from a network node, an allocation of a pair of resources at a user equipment operating in a first mode of vehicle-to-vehicle communication that is configured to use resources from a shared transmit pool of a second mode of vehicle-to-vehicle communication, wherein a first resource of the pair of resources is allocated from an exclusive transmit pool for the first mode, and a second resource of the pair of resources is allocated from the shared transmit pool;

determining whether the second resource is ready to replace the first resource; and replacing the first resource with the second resource when it is determined that the second resource is ready to replace the first resource.

19. The method according to claim 18, wherein the first mode of vehicle-to-vehicle communication is based on network scheduled resource allocation and the second mode of vehicle-to-vehicle communication is based on user equipment selected autonomous resource allocation.

20. The method according to claim 18, wherein the determining that the second resource is ready to replace the first resource comprises determining that the second resource is collision-free.

* * * * *